No. 698,029. Patented Apr. 22, 1902.
H. KRUEGER & R. J. HOFFMAN.
LINE GUIDE FOR FISHING REELS.
(Application filed Aug. 1, 1901.)
(No Model.) 2 Sheets—Sheet 1.
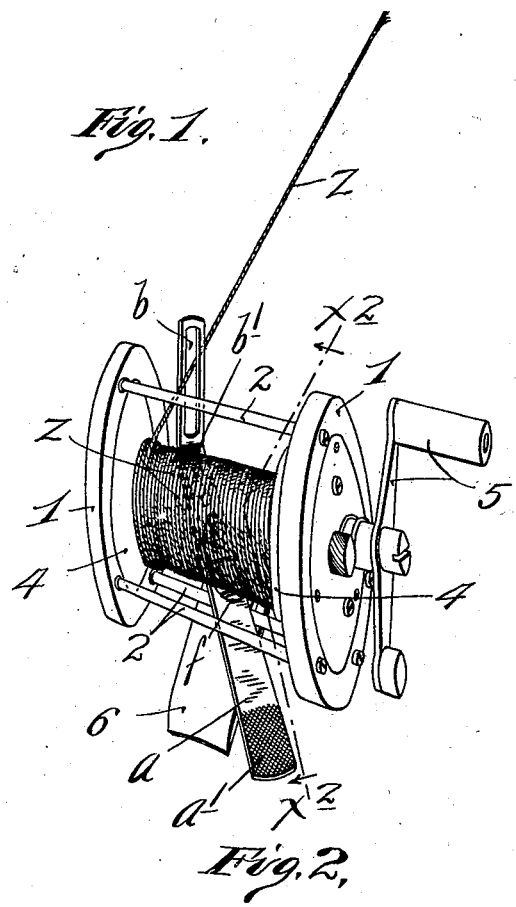
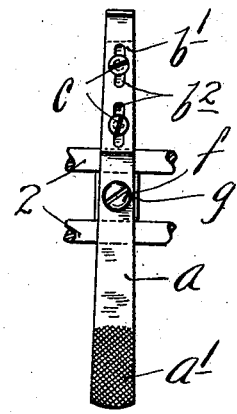
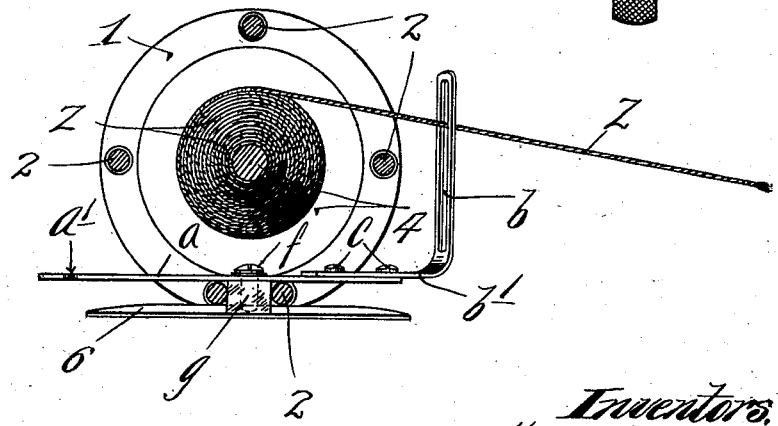

No. 698,029. Patented Apr. 22, 1902.
H. KRUEGER & R. J. HOFFMAN.
LINE GUIDE FOR FISHING REELS.
(Application filed Aug. 1, 1901.)
(No Model.) 2 Sheets—Sheet 2.
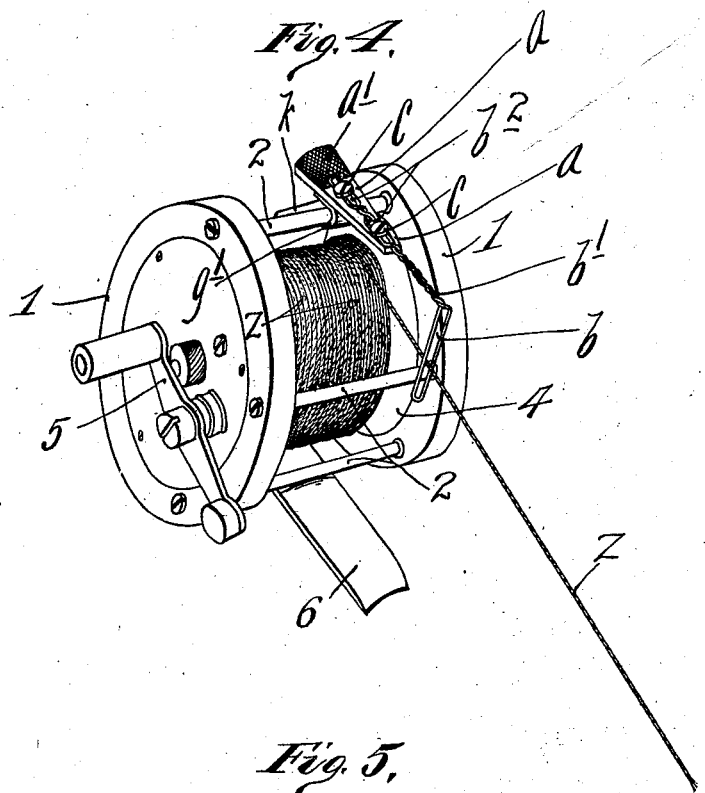
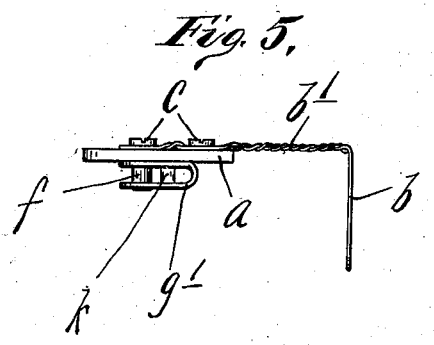

UNITED STATES PATENT OFFICE.

HENRY KRUEGER AND RICHARD J. HOFFMAN, OF MINNEAPOLIS, MINNESOTA; SAID HOFFMAN ASSIGNOR TO SAID KRUEGER.

LINE-GUIDE FOR FISHING-REELS.

SPECIFICATION forming part of Letters Patent No. 698,029, dated April 22, 1902.

Application filed August 1, 1901. Serial No. 70,453. (No model.)

*To all whom it may concern:*

Be it known that we, HENRY KRUEGER and RICHARD J. HOFFMAN, citizens of the United States, residing at Minneapolis, in the county of Hennepin and State of Minnesota, have invented certain new and useful Improvements in Line-Guides for Fishing-Reels; and we do hereby declare the following to be a full, clear, and exact description of the invention, such as will enable others skilled in the art to which it appertains to make and use the same.

Our present invention has for its object to provide an improved line-guide for fishing-reels; and to this end it consists of the novel devices and combinations of devices hereinafter described, and defined in the claims.

The invention is illustrated in the accompanying drawings, wherein like characters indicate like parts throughout the several views.

Figure 1 is a perspective view showing an ordinary fishing-reel having one of our improved line-guides applied thereto. Fig. 2 is a vertical section taken approximately in the plane indicated by the dotted lines $x^2 \: x^2$ on Fig. 1. Fig. 3 is a detail showing in plan view the line-guide illustrated in Fig. 1 and also portions of the reel. Fig. 4 is a perspective view showing another of our improved line-guides applied to the top bar of the reel, and Fig. 5 is a side elevation of the line-guide shown in Fig. 4.

Of the parts of the reel it is only necessary for the purposes of this case to enumerate the sides 1; the spacing-rods 2, connected with said sides; the spool 4; the operating-crank 5, and the pole-clip or reel-base 6. The character $z$ indicates the line, which is wound in the ordinary way upon the spool 4.

The line-guide is afforded by a lever $a$, which is provided at its forward end with an elongated guiding-loop $b$, through which the line $z$ is passed. The loop $b$ in the best form of the device is formed at the end of an adjustable stem $b'$, which stem is provided at its inner end with elongated screw seats or perforations $b^2$, through which screws $c$ are passed and screwed into the body of said lever $a$. In this way the lever is made adjustable, so as to adapt the device for application to reels of different size.

In the construction illustrated in Figs. 1 to 3, inclusive, the lever $a$ is pivoted by a stud or machine-screw $f$ to a base piece or block $g$, which in turn is soldered or otherwise rigidly secured to the pole-clip 6. In this case the body of the lever $a$ is extended below the spool and close to the said clip 6.

In the construction illustrated in Figs. 4 and 5 the lever $a$ is pivoted by the stud or screw $f$ to a U-shaped base-piece $g'$, which straddles or embraces one of the upper spacing-rods 2 of the reel. A wedge $k$, driven between the stud $f$ and the embraced rod 2, rigidly but detachably secures the lever $a$ in working position.

In both constructions the rear end of the lever $a$ is adapted to be engaged by the thumb of the hand used to hold the pole to which the reel is applied, and to prevent slipping of the thumb the said rear ends of the levers are roughened or knurled, as shown at $a'$.

In practice we have found that with line-guides arranged to slide upon the spacing-rods of the reel they will at times bind or stick, this being especially so when the rods become wet. We have further found that the pivoted device which is the subject of this application will never stick, whether wet or dry, and gives much better satisfaction generally than the said prior devices.

The arrangement illustrated in Figs. 1 to 3, inclusive, wherein the guide-lever is extended below the spool, has many advantages over that illustrated in Figs. 4 and 5. It is adapted for application to very large reels, as well as to small ones. By extending the lever under the spool its rear end is projected where it may be much more easily engaged by the thumb than when placed at the top of the reel. This feature of construction is therefore very important from several points of view. Both of the devices are adapted for application to reels now in general use and are furthermore of very small cost.

It will of course be understood that our invention is capable of other modifications not herein set forth.

What we claim, and desire to secure by Letters Patent of the United States, is as follows:

1. A line-guide for reels comprising a pivoted lever having a thumb or finger piece and a line-guide, through the latter of which the line is passed, substantially as described.

2. A line-guide for reels, comprising a lever pivoted at its intermediate portion to a suitable support and provided at one end with a thumb-piece and at its other end with a guide-loop, through which loop the line is passed, substantially as described.

3. A line-guide for reels, comprising a lever pivoted at its intermediate portion and provided at one end with a thumb-piece and at its other end with an adjustable guide-loop through which the loop-line is passed, substantially as described.

4. A line-guide for reels, comprising the lever $a$ pivoted to a suitable support at $f$ and provided at one end with a thumb-piece $a'$ and at its other end with the guide-loop $b$, having the stem $b'$ adjustably secured to the body of said lever $a$ by one or more screws $c$, substantially as described.

In testimony whereof we affix our signatures in presence of two witnesses.

HENRY KRUEGER.
RICHARD J. HOFFMAN.

Witnesses:
E. H. KEECHER,
F. D. MERCHANT.